United States Patent
Hosseini et al.

[19]

[11] Patent Number: 6,115,661

[45] Date of Patent: Sep. 5, 2000

[54] END-OF-FILL DETECTOR FOR A FLUID ACTUATED CLUTCH

[75] Inventors: Javad Hosseini, Edelstein; Randall M. Mitchell, Washington; Ashok Kajjam; Alan L. Stahl, both of Peoria, all of Ill.

[73] Assignee: Caterpillar Inc., Peoria, Ill.

[21] Appl. No.: 09/057,567

[22] Filed: Apr. 9, 1998

[51] Int. Cl.[7] .............................. G06F 17/00; G06F 19/00
[52] U.S. Cl. .................................. 701/51; 701/67; 701/87; 192/85 R; 192/109 F
[58] Field of Search .................................. 701/51, 67, 68, 701/87, 84, 88, 90, 101; 192/85 R, 109 F, 103 F, 3.3, 3.31, 3.29, 3.58; 74/337, 733.1

[56] References Cited

U.S. PATENT DOCUMENTS

| | | |
|---|---|---|
| 3,956,947 | 5/1976 | Leising et al. .............................. 74/866 |
| 4,208,929 | 6/1980 | Heino et al. .............................. 74/731 |
| 4,414,863 | 11/1983 | Heino ........................................ 74/866 |
| 4,419,909 | 12/1983 | Opperud et al. .......................... 74/856 |
| 4,653,350 | 3/1987 | Downs et al. ............................. 74/864 |
| 4,707,789 | 11/1987 | Downs et al. ........................ 364/424.1 |
| 4,724,939 | 2/1988 | Lockhart et al. ......................... 192/3.3 |
| 4,790,418 | 12/1988 | Brown et al. ......................... 192/0.032 |
| 4,796,490 | 1/1989 | Butts et al. ................................. 74/866 |
| 4,836,057 | 6/1989 | Asayama et al. .......................... 74/867 |
| 4,838,124 | 6/1989 | Hamano et al. ........................... 74/866 |
| 4,841,815 | 6/1989 | Takahashi .................................. 74/866 |
| 4,843,902 | 7/1989 | Patton et al. ............................... 74/335 |
| 4,854,194 | 8/1989 | Kaneko et al. ............................ 74/866 |
| 4,855,913 | 8/1989 | Brekkestran et al. ................ 364/424.1 |
| 4,875,391 | 10/1989 | Leising et al. ............................. 74/866 |
| 4,953,679 | 9/1990 | Okino ................................. 192/0.096 |
| 4,955,256 | 9/1990 | Kashihara et al. ........................ 74/866 |
| 4,967,385 | 10/1990 | Brekkestran et al. ............. 364/571.03 |
| 4,967,611 | 11/1990 | Sugano ...................................... 74/868 |
| 4,967,620 | 11/1990 | Shimanaka ................................ 74/866 |
| 4,968,999 | 11/1990 | Fodale et al. ......................... 364/424.1 |
| 4,969,098 | 11/1990 | Leising et al. ........................ 364/424.1 |
| 4,975,845 | 12/1990 | Mehta .................................. 364/424.1 |
| 4,981,053 | 1/1991 | Yamaguchi ................................ 74/866 |
| 4,982,620 | 1/1991 | Holbrook et al. ...................... 74/731.1 |

(List continued on next page.)

FOREIGN PATENT DOCUMENTS

| | | |
|---|---|---|
| 0357184A1 | 3/1990 | European Pat. Off. . |
| 0196358B1 | 5/1990 | European Pat. Off. . |
| 0435372A2 | 7/1991 | European Pat. Off. . |
| 0435375A3 | 7/1991 | European Pat. Off. . |
| 0435377A2 | 7/1991 | European Pat. Off. . |
| 0435377A3 | 7/1991 | European Pat. Off. . |
| 0372073B1 | 2/1994 | European Pat. Off. . |
| 0435375A2 | 7/1994 | European Pat. Off. . |
| 4017961 | 12/1990 | Germany . |
| 3407716 | 1/1993 | Germany . |
| 2212871A | 8/1989 | United Kingdom . |
| WO9102913 | 3/1991 | WIPO . |

OTHER PUBLICATIONS

Article from Off–Highway Engineering Magazine dated Apr. 1993 entitled "Transmission Control System for Bulldozers".

(List continued on next page.)

*Primary Examiner*—William A. Cuchlinski, Jr.
*Assistant Examiner*—Gertrude Arthur
*Attorney, Agent, or Firm*—Kevin M. Kercher; Jeffrey L. Myers

[57] ABSTRACT

In one aspect of this invention, a fluid actuated clutch is disclosed. The fluid actuated clutch is operatively connected to a control valve that is actuated by an electronic controller that receives a signal from an input mechanism, including a value for speed of an engine drive and a value of output speed for a torque converter. The method includes detecting a torque converter ratio which is the output speed of the torque converter divided by the engine drive speed, and detecting if there is at least one torque converter decrease exceeding a predetermined level and preferably detecting if there are at least two consecutive decreases in the torque converter ratio with at least one of the torque converter decreases exceeding a predetermined minimum level. This condition represents the end-of-fill point for the fluid actuated clutch.

20 Claims, 4 Drawing Sheets

U.S. PATENT DOCUMENTS

| | | |
|---|---|---|
| 4,989,470 | 2/1991 | Bulgrien .................................... 74/335 |
| 4,991,455 | 2/1991 | Bulgrien .................................... 74/336 |
| 5,004,084 | 4/1991 | Mehr-Ayin et al. ................. 192/0.033 |
| 5,005,441 | 4/1991 | Narita ........................................ 74/866 |
| 5,005,444 | 4/1991 | Kimura et al. ............................ 74/868 |
| 5,005,680 | 4/1991 | Satoh et al. ............................ 192/3.55 |
| 5,007,308 | 4/1991 | Narita ........................................ 74/866 |
| 5,014,573 | 5/1991 | Hunter et al. ............................. 74/866 |
| 5,014,575 | 5/1991 | Fujiwara et al. .......................... 74/866 |
| 5,016,175 | 5/1991 | Baltusis et al. ....................... 364/424.1 |
| 5,018,408 | 5/1991 | Bota et al. ................................. 74/866 |
| 5,029,086 | 7/1991 | Yoshimura ........................... 364/424.1 |
| 5,029,492 | 7/1991 | Kiuchi ....................................... 74/844 |
| 5,029,494 | 7/1991 | Lentz et al. ............................... 74/866 |
| 5,033,328 | 7/1991 | Shimanaka ................................ 74/866 |
| 5,035,312 | 7/1991 | Asayama et al. ..................... 192/85 R |
| 5,036,718 | 8/1991 | Bulgrien .................................... 74/335 |
| 5,036,730 | 8/1991 | Sakai et al. ............................... 74/866 |
| 5,038,286 | 8/1991 | Asayama et al. ..................... 364/424.1 |
| 5,038,636 | 8/1991 | Vukovich et al. ..................... 74/424.1 |
| 5,046,174 | 9/1991 | Lentz et al. .......................... 364/424.1 |
| 5,046,175 | 9/1991 | Lentz et al. .......................... 364/424.1 |
| 5,046,176 | 9/1991 | Lin ....................................... 364/424.1 |
| 5,046,178 | 9/1991 | Hibner et al. ........................ 364/424.1 |
| 5,050,456 | 9/1991 | Fukuda ...................................... 74/866 |
| 5,050,458 | 9/1991 | Vukovich et al. ......................... 74/866 |
| 5,052,246 | 10/1991 | Yamaguchi ............................... 74/866 |
| 5,053,960 | 10/1991 | Brekkestran et al. ............... 364/424.1 |
| 5,054,599 | 10/1991 | Marcott ...................................... 192/85 |
| 5,056,639 | 10/1991 | Petzold et al. ....................... 192/0.076 |
| 5,058,460 | 10/1991 | Hibner et al. ............................. 74/867 |
| 5,063,813 | 11/1991 | Lentz ........................................ 74/866 |
| 5,063,814 | 11/1991 | Baba et al. ................................ 74/866 |
| 5,067,084 | 11/1991 | Kau ......................................... 364/453 |
| 5,067,373 | 11/1991 | Kyohzuka et al. ........................ 74/866 |
| 5,067,374 | 11/1991 | Sakai et al. ............................... 74/866 |
| 5,069,084 | 12/1991 | Matsuno et al. .......................... 74/844 |
| 5,070,747 | 12/1991 | Lentz et al. ............................... 74/866 |
| 5,072,390 | 12/1991 | Lentz et al. .......................... 364/424.1 |
| 5,085,105 | 2/1992 | Wakahara et al. ........................ 74/866 |
| 5,101,943 | 4/1992 | Bulgrien ................................ 192/3.63 |
| 5,113,720 | 5/1992 | Asayama et al. ......................... 74/866 |
| 5,119,697 | 6/1992 | Vukovich et al. ........................ 74/867 |
| 5,154,099 | 10/1992 | Asatsuke et al. ......................... 74/867 |
| 5,163,342 | 11/1992 | Pollack et al. ............................ 74/866 |
| 5,168,973 | 12/1992 | Asayama et al. ..................... 192/85 R |
| 5,174,137 | 12/1992 | Kato et al. .............................. 73/118.1 |
| 5,188,005 | 2/1993 | Sankpal et al. ........................... 74/866 |
| 5,190,130 | 3/1993 | Thomas et al. ...................... 192/0.032 |
| 5,209,141 | 5/1993 | Asayama et al. ......................... 74/866 |
| 5,211,079 | 5/1993 | Runde et al. .............................. 74/866 |
| 5,216,606 | 6/1993 | Lentz et al. .......................... 364/424.1 |
| 5,224,577 | 7/1993 | Falck et al. .......................... 192/0.092 |
| 5,251,509 | 10/1993 | Pollack et al. ............................ 74/861 |
| 5,289,741 | 3/1994 | Debs et al. ................................ 74/866 |
| 5,311,795 | 5/1994 | Yoshimura et al. ...................... 74/867 |
| 5,403,248 | 4/1995 | Ando et al. ............................. 477/130 |
| 5,467,854 | 11/1995 | Creger et al. ......................... 192/87.18 |
| 5,468,198 | 11/1995 | Holbrook et al. ...................... 477/143 |
| 5,472,389 | 12/1995 | Ando et al. ............................. 477/130 |
| 5,580,332 | 12/1996 | Mitchell et al. ........................ 477/143 |
| 5,950,789 | 9/1999 | Hosseini et al. ..................... 192/85 R |

OTHER PUBLICATIONS

Article No. 820392 entitled "Electronic Control of Automobile Transmissions" by G. Pannier and A. Laport.

Article No. 820394 entitled "Microcomputer Controlled Automatic Transmission" by A. L. Miller.

Article No. 830880 entitled "Development of NISSAN Microprocessor Control Four Speed Lockup Automatic Transmission" by I. Suga et al.

Article No. 840448 entitled "Electronic Control of a 4–speed Automatic Transmission with Lock–Up Clutch" by M. Schwab.

Article No. 901154 entitled "Trends of Powertrain Control" by N. Narumi et al.

Article No. 901156 entitled "Electronically–Controlled Transmission Systems—Current Position and Future Developments" by M. Schwab.

Article No. 901157 entitled "Advanced Controls for Heavy Duty Transmissions Applications" by J. Bender and K. Struthers.

Article No. 901160 entitled "Powertrain Electronics—Progress on the Use and Development of the Computer Aided Gearshift Systems" by Bader.

Komatsu Technical Guide entitled "K–Atomics—Komatsu–Advanced Transmission with Optimum Modulation Control".

SAE Article 890528 entitled "The Chrysler A–604 Ultradrive 4–Speed Automatic Transaxle" by B. Martin and T. Nogle.

SAE Article No. 861050 entitled "Electronically Controlled Mechanical Automatic Transmission for Heavy Duty Trucks and Busses" by S. Tanaka.

SAE Article No. 890529 entitled "The All–Adaptive Controls for the Chrysler Ultradrive Transaxle" by M. Leising et al.

SAE Article No. 890530 entitled "Nissan Electronically Controlled Four Speed Automatic Transmission" by M. Shinohara et al.

SAE Technical Paper No. 861170 entitled "Digital Electronic Controls for Detroit Diesel Allison Heavy Hauling Transmissions" by R.C. Boyer.

SAE Technical Paper No. 861212 entitled "The Design and Development of A Four Speed Powershift Transmission." by J.E. Goodbar et al.

SAE Technical Paper No. 880480 entitled "Borg–Warner Australia Model 85 Automatic Transmission" by E. Wilfinger and J. Thompson.

SAE Technical Paper No. 892000 entitled "A Study on Electro–Hydraulic Control for Automatic Transmission" by K. Hasunaka et al.

SAE Technical Paper No. 900550 entitled "Toyota "ECT–i" a New Automatic Transmission with Intelligent . . . " by T. Kondo et al.

SAE Technical Paper No. 901557 entitled "A Transmission Control System for Construction Machinery" by K. Kusaka and Y. Ohkura.

SAE Technical Paper No. 901592 entitled "Adaptive Electronic Tractor Shift Control System" by L. Ross and D. Panoushek.

SAE Technical Paper No. 910082 entitled "An Engine & Transmission Control System with New 16–bit Single Chip . . . " by S. Kuroyanagi et al.

SAE Technical Paper No. 910410 entitled "SCVT—A State of the Art Electronically Controlled Continuously Variable . . . " by S. Hirano et al.

SAE Technical Paper No. 910639 entitled "Analysis of a New Automatic Transmission Control System for LEXUS LS400" by H. Taniguchi et al.

SAE Technical Paper No. 910750 entitled "Diesel Deposit Forming Tendencies—Microanalysis Methods" by J. Perez et al.

SAE Technical Paper No. 911831 entitled "User–Friendly Electronic Powershift Transmission Controls" by G. Bulgrien.

SAE Technical Paper No. 911880 entitled "New Kubota Midsize Farm Tractor" by Shinohara et al.

SAE Technical Paper No. 911938 entitled "Improving Automatic Transmission Shift Quality by Feedback Control . . . " by Y. Narita.

Fig-3

END-OF-FILL DETECTOR FOR A FLUID ACTUATED CLUTCH

TECHNICAL FIELD

This invention relates generally to a method of transmission control and, more particularly, to a method of determining the end-of-fill point for a fluid actuated clutch.

BACKGROUND ART

In general, a powershift transmission includes a number of gear elements that couple the input and output shafts with a related number of associated clutches that selectively engage the gear elements to move in either the forward direction or reverse direction and establish a desired speed ratio between the input shaft and output shaft. An electronic control system is typically utilized to smoothly engage and disengage a clutch. This electronic control system provides an interface between the clutches through a plurality of associated solenoid valves. The solenoid valves are modulated in order to control the clutch pressures in response to command signals from the electronic control unit.

To precisely time the shifting of the clutches, the fill time becomes an important parameter. Fill time is defined as the time required to fill an oncoming clutch cavity with fluid. During this fill period, the clutch piston will stroke and the clutch plates will move to the point of "touch-up". However, until the clutch plates are compressed together, the clutch cannot transmit any significant torque. Therefore, the end-of-fill time is important to ascertain when this critical moment is reached. A harsh engagement can result in a torque spike that is transmitted through the drivetrain of the machine and creates a "jerk". This jerk is uncomfortable to the operator and diminishes the life expectancy of the associated drivetrain components of the machine.

One known arrangement utilizes a separate flow sensing valve having an electrical switch disposed thereon. The flow into the flow sensing valve is directed through a fixed orifice to the associated hydraulic clutch. Once the flow through the valve ceases, the absence of a pressure drop across the fixed orifice permits the flow sensing valve to return to a spring biased, flow blocking position. Once the flow sensing valve is in the spring biased position, this triggers an electrical switch that indicates that the clutch is filled. A major drawback with this arrangement is that it requires all fluid to flow through a fixed orifice and also through a separate flow sensing switch for each clutch in the system.

Still another known mechanism for determining end-of-fill is to control the amount of time that fluid is allowed to flow toward the clutch. These arrangements do not account for variances in control valves or clutch activating chambers. To overcome these variances, a number of control schemes have been devised to adaptively change the fill time based on previous clutch fills. However, these control schemes depend on costly and time consuming calibration techniques.

Yet another technique for determining the end-of-fill point involves monitoring the electronic activation of the control valve that directs fluid to the clutch. When the actuating chamber of the clutch is full, the increase in pressure operates upon the control valve to move it back to a flow blocking position. The force that is acting to move the control valve back to the flow blocking position is acting against the electrical force that moved the control valve to the flow passing position. This creates an electrical voltage spike that is detected by an electronic controller. This voltage spike represents the end-of-fill point. A drawback with this technique is that a separate control scheme is required for each clutch control valve.

The present invention is directed to overcoming one or more of the problems set forth above.

DISCLOSURE OF THE INVENTION

In one aspect of this invention, a fluid actuated clutch is disclosed. The fluid actuated clutch is operatively connected to a control valve that is actuated by an electronic controller that receives a signal from an input mechanism, including a value for speed of an engine drive and a value of output speed for a torque converter. The method includes detecting a torque converter ratio which is the output speed of the torque converter divided by the engine drive speed, and detecting if there is at least one torque converter decrease exceeding a predetermined level and preferably detecting if there are at least two consecutive decreases in the torque converter ratio with at least one of the torque converter decreases exceeding a predetermined minimum level. This condition represents the end-of-fill point for the fluid actuated clutch.

BRIEF DESCRIPTION OF THE DRAWINGS

For a better understanding of the present invention, reference may be made to the accompanying drawings in which.

BEST MODE FOR CARRYING OUT THE INVENTION

Figure 1:
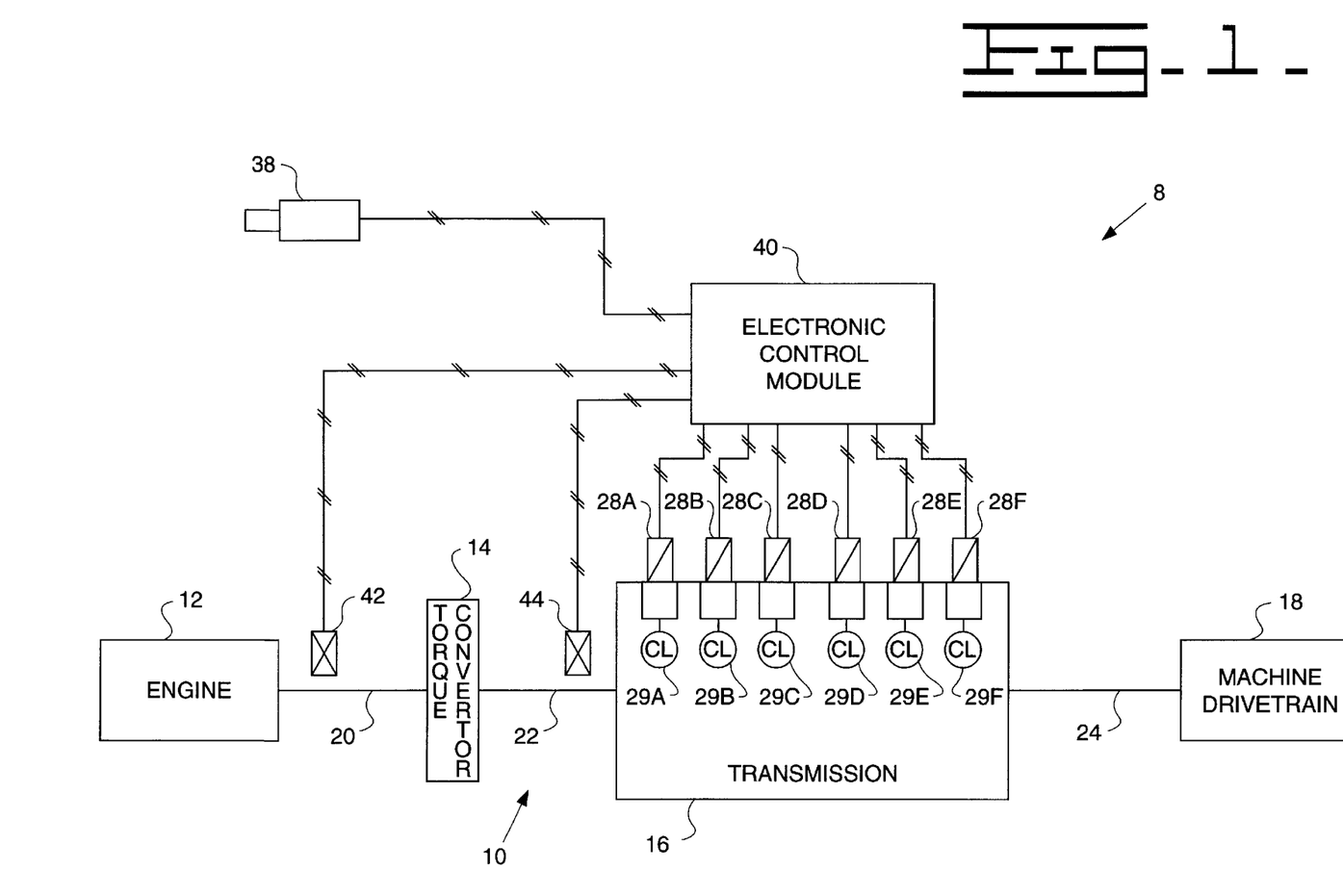
FIG. 1 is a block diagram of an electronic control system of a machine drivetrain including a transmission.

Referring now to the drawings, and initially to FIG. 1, an electronic control system 8 of a drivetrain 10 is depicted that includes an internal combustion engine 12, a fluidic torque converter 14, a multi-speed fluid operated power transmission 16, and a machine drivetrain 18. The engine 12 is connected to the torque converter 14 by a first shaft 20, the torque converter 14 is connected to the transmission 16 by a second shaft 22, and the transmission 16 is connected to the machine drivetrain 18 by a third shaft 24.

The control portion of the drivetrain will now be discussed. An operator produces a desired shift by means of an operator shift handle 38 if in manual mode or the shift is produced by software in automatic mode based on machine operation. In automatic mode, the software will determine when to upshift or downshift. This produces a gear selection signal. An electronic control module 40 receives the gear selection signal and then controls the operation of an appropriate one of a plurality of a set of solenoid control valves 28 identified as "A", "B", "C", "D", "E", and "F", respectively. The electronic control system also receives various other inputs representing machine system parameters. These other inputs include an engine speed signal from an engine speed sensor 42 and a torque converter output signal from a torque converter output sensor 44. The torque converter output ratio is defined as the torque converter output speed divided by the engine speed.

The engine speed sensor 42 and the torque converter output sensor 44 are conventional electrical transducers, preferably magnetic speed pickups but could include other speed-type sensing elements such as torque sensors and accelerometers.

The electronic control module 40 delivers a clutch command signal that is proportional to the desired current needed to operated the selected solenoid control valve 28A through 28F. In the preferred embodiment, the current driver utilizes a pulse width modulated voltage to produce the desired current. The solenoid control valves 28A through 28F are configured to maintain communication of oil to a respective one of a plurality of a set of clutches 29, identified as "A", "B", "C", "D", "E", and "F", respectively, that is sufficient to maintain a clutch pressure that is proportional to the solenoid current. Therefore, the electronic control module 40 controls the clutch pressure by means of a proportional command signal provided to the selected solenoid control valve 28A through 28F.

Figure 2:
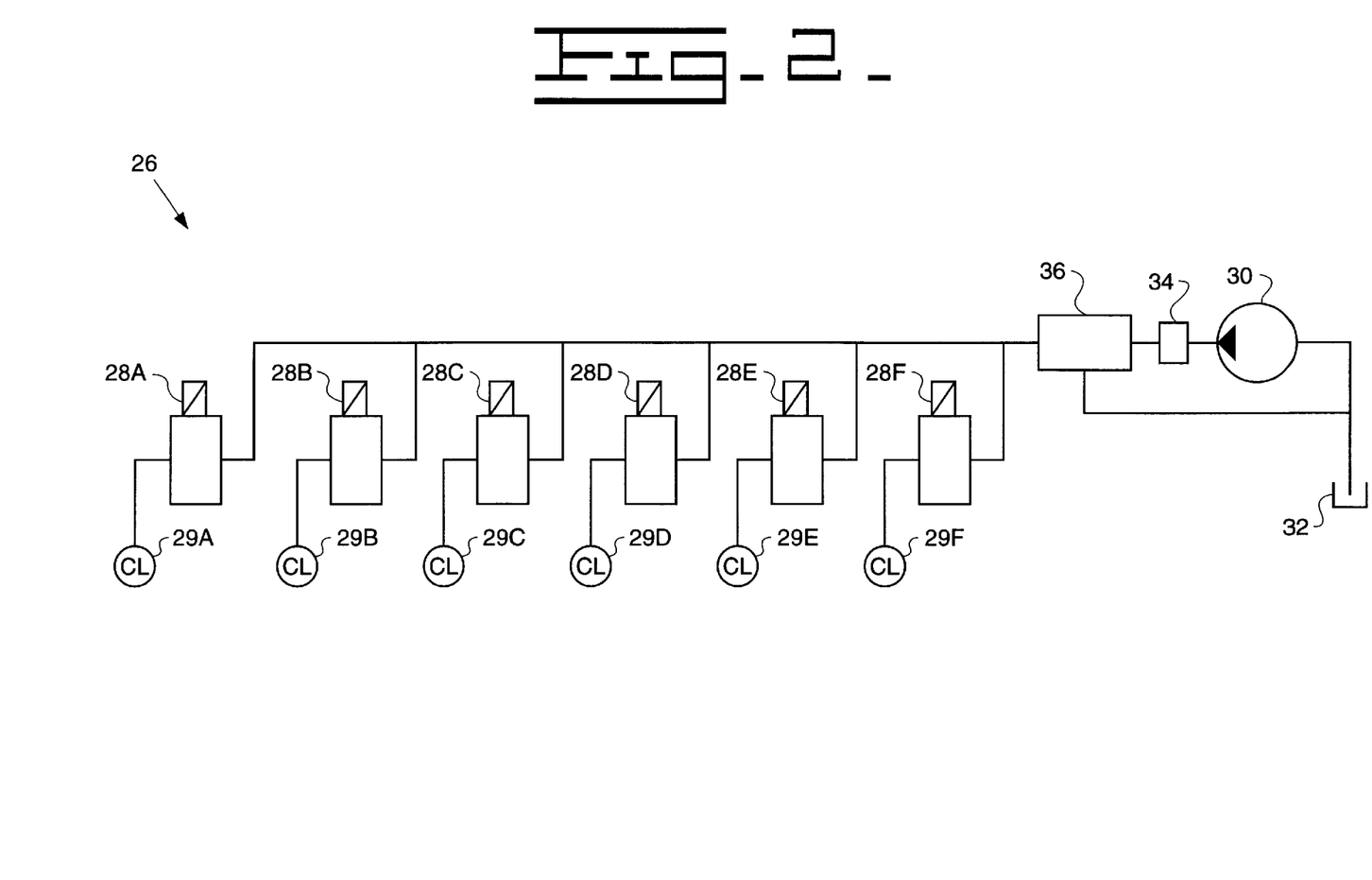
FIG. 2 is a block diagram illustrating an embodiment of a hydraulic clutch system for a transmission.

Referring now to FIG. 2, a block diagram of a hydraulic clutch system for transmission is shown. As merely an illustrative example, FIG. 2 represents the number of clutches 29A through 29F found in a typical wheeled machine transmission 26. This wheeled machine transmission 26 differs from other types of machine transmissions by the number of clutches utilized. The transmission of FIG. 2 includes six clutches 29A through 29F, where 29A is a reverse direction clutch, 29B is a forward direction clutch, and clutches 29C through 29D are speed clutches. Direction changing and gear shifting is accomplished by means of selectively engaging and disengaging various combinations of the clutches 29A through 29F. The clutches 29A through 29F are actuated by hydraulic pressure and upon engagement, require a requisite amount of fill time before torque is initiated between a friction element that provides a driving force and a friction element that is driven by the friction element having the driving force. In other words, the fill time is the elapsed time between the time that the clutch piston moves from the released to the initial engagement position. The clutches 29A through 29F are selectively engaged and disengaged by means of respective solenoid operated, proportional pressure control valves 28A through 28F.

The hydraulic circuit of the transmission includes a positive displacement pump 30 that supplies pressurized hydraulic fluid from the sump or reservoir 32, through a filtering unit 34, to the clutches 29A through 29F through the control valves 28A through 28F. Optionally, a pressure relief valve 36 may be added to regulate the valve supply pressure. Although speed clutches have been mentioned, the present invention is directed towards directional clutches. However, the present invention could be directed to torque transmitting types of clutches that are not defined as either speed or directional.

Figure 3:
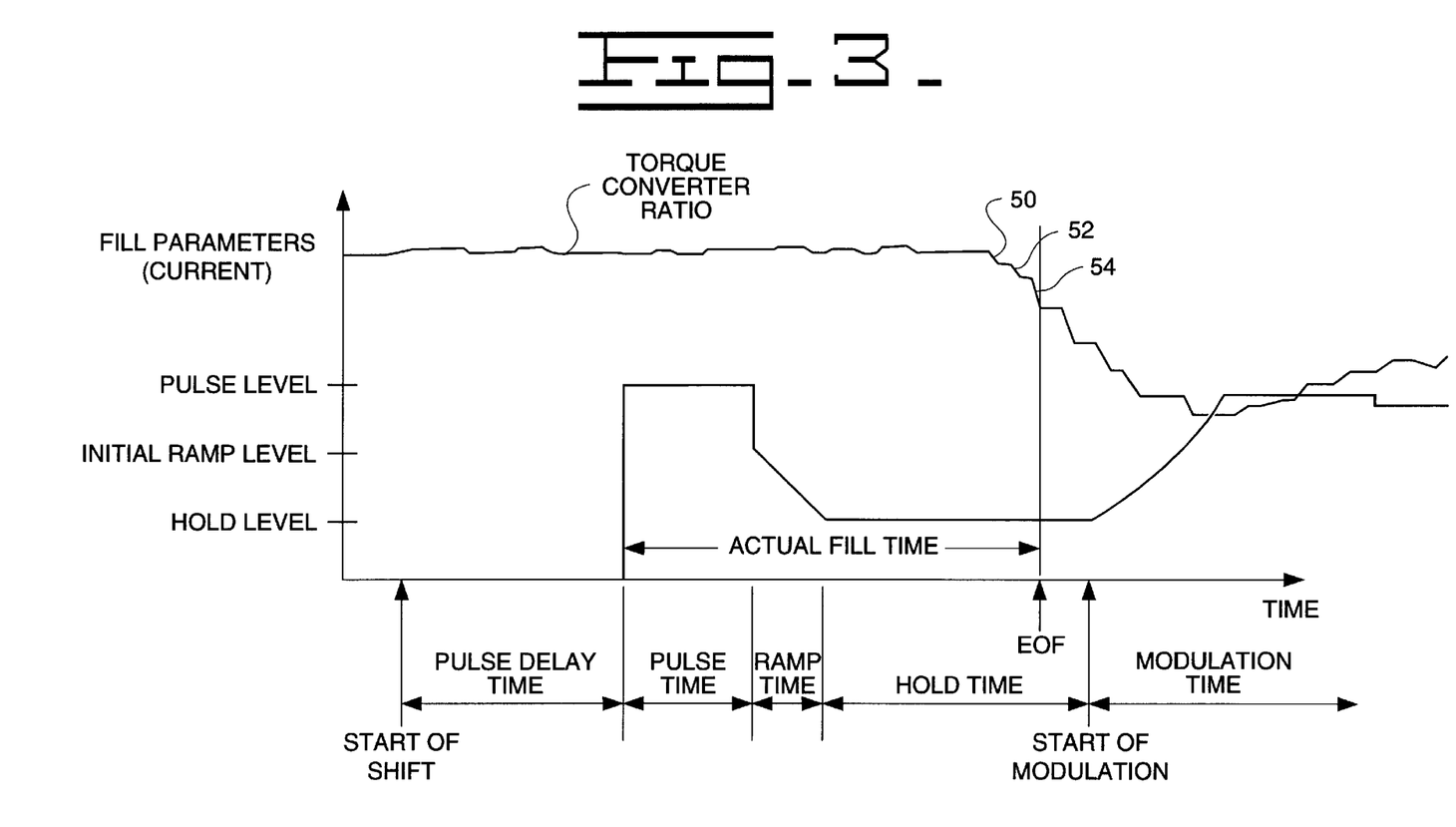
FIG. 3 shows a timing chart illustrating the current level during the pulse time, ramp time, hold time, modulation time, and end-of-fill point in correlation with the torque converter ratio.

The command pulses utilized to perform a fluid actuated clutch shift are depicted in FIG. 3. Immediately at the start of the clutch shift, there is a small pulse delay time period. As shown, the command pulse is pulsed at a relatively high level for a predetermined period of time. This command pulse quickly opens one or more of the solenoid control valves 28A through 28F to begin filling the respective fluid actuated clutches 29A through 29F and thereby stroking the respective fluid actuated clutch piston. The fluid actuated clutch command is then decreased from a ramp level during the ramp time to a hold level having a duration sufficient to completely fill the respective fluid actuated clutch 29A through 29F. The value of the hold level is high enough to ensure completion of clutch fill and yet low enough to prevent torque transmission when the clutch plates "touch up". After the respective fluid actuated clutch 29A through 29F is filled, the clutch pressure enters a modulation time period. This modulation phase can utilize either an open or closed loop control to gradually increase the clutch pressure to cause a desired decrease in clutch slip. The pressure within the respective clutch 29A through 29F is increased to a level and held to maintain the respective clutch 29A through 29F in its fully engaged position.

Once again, the crucial point to determine is the end-of-fill. If this point can be ascertained with reasonable certainty, then a smooth transition into the modulation time period can result so that the clutch pressure is slowly and gradually increased with a corresponding decrease in clutch slip. This will prevent the torque spike that causes jerk and creates discomfort to the operator as well as decreasing the life expectancy of the drivetrain components. Either early or late engagement will cause a torque spike. The end-of-fill point will occur during the hold period when pressure on the respective clutch 29A through 29F is the lowest.

Also, as shown in FIG. 3, the torque converter ratio is depicted in correlation with the current level of the fill parameters. For technological simplicity and ease of operation, shorter program cycle times are preferred so that when there is a second consecutive decrease in the torque converter output and where there is at least one decrease that is greater than a predetermined value, this point in time will be the end-of-fill. As illustrated, a first torque converter ratio decrease 50 and a second torque converter ratio decrease 52 are relatively small and do not exceed the threshold limit. However, the third torque converter ratio decrease 54 does exceed the threshold limit so at this point, the torque converter ratio indicates the end-of-fill point for that clutch. As shown, there are additional, consecutive torque converter ratio decreases, however, these torque converter ratio decreases are not relevant because the end-of-fill point has already been determined. With less preferred, longer program cycle times, only one decrease in the torque converter ratio below a predetermined value is required. This threshold limit varies depending on the design and structure of the respective clutch 29A through 29F. The design and structure of the clutches 29A through 29F depend upon the type and nature of the machine and the machine manufacturer. An illustrative, but nonlimiting, example would include a threshold decrease of four (4) for the torque converter ratio of a midsize wheel loader or midsize track-type tractor.

Figure 4:
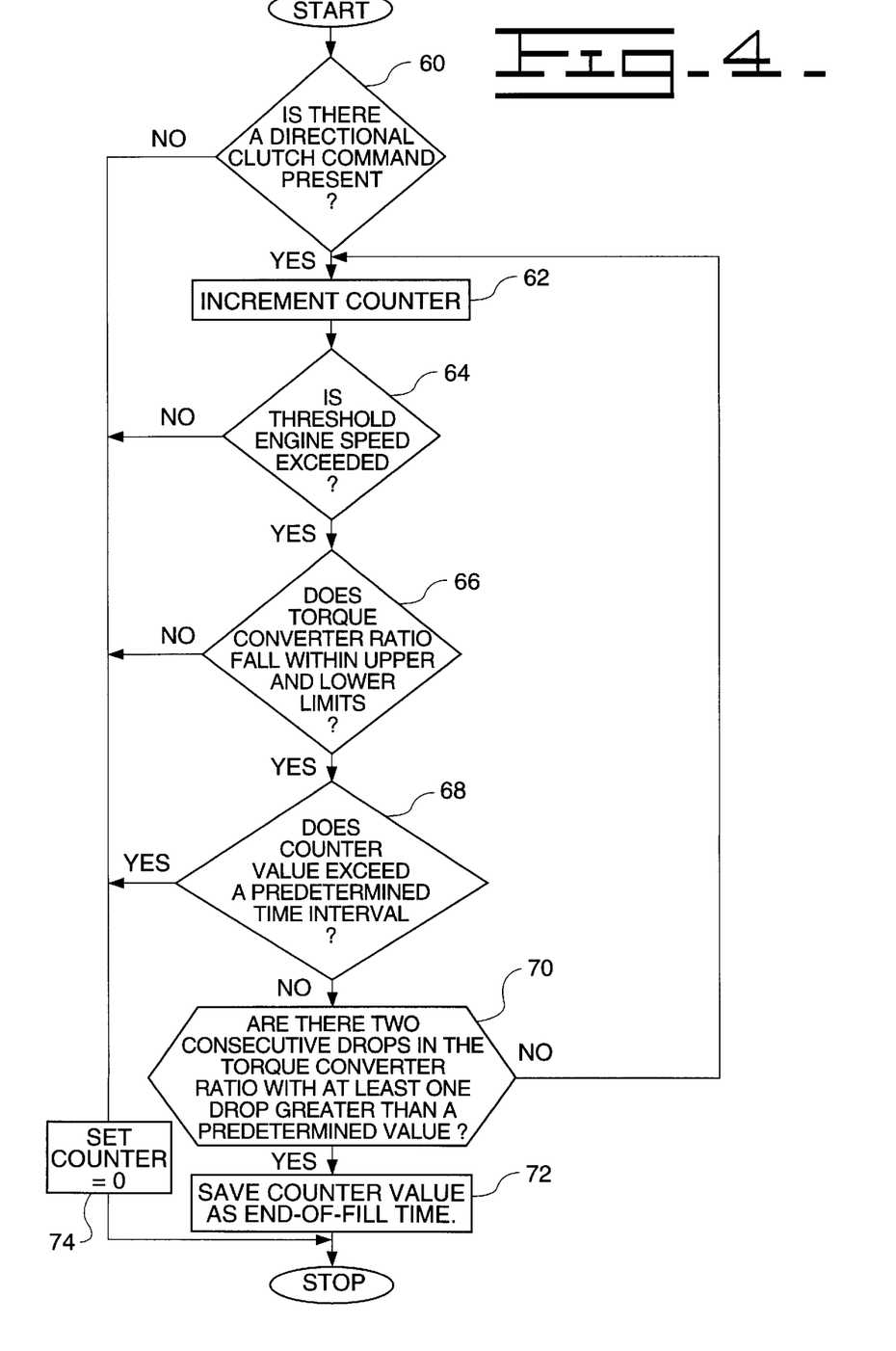
FIG. 4 is a flowchart illustrating software for determining the end-of-fill point for a fluid actuated clutch.

The end-of-fill detecting software will now be discussed with reference to FIG. 4, which depicts a flowchart representative of the computer program instructions executed by the electronic control module 40 shown in FIG. 1. In the description of the flowcharts, the functional explanation marked with numerals in angle brackets, <nnn>, will refer to the flowchart blocks bearing that number. As shown in FIG. 4, the program first determines whether a clutch command is present <60>. If the answer is no, the counter will be set to zero <74> and the process will stop. If the answer is yes, then a counter will be incremented by one (1) <62>. The value of the counter value is correlated to a value in real time. Preferably, the value of the counter is correlated to a value in real time by a timing function associated with the electronic control module 40.

There are three steps, although not critical to the process in principle, which attempt to minimize the possibility of detecting a false end-of-fill point and operate as a safeguard. These three steps are preferably monitored throughout the process or may be monitored once prior to the start of the primary program step. The first of these steps involves the determination of whether the engine speed exceeds a minimum threshold value <64>. This minimum threshold value is totally dependent on the type of engine utilized in that particular machine. An illustrative, but nonlimiting example, is a motor speed of 1,500 revolutions per minute for midsize wheel loaders and track-type tractors. If the answer to this query is no, the counter is set to zero <74> and the program stops. Otherwise, the program will progress to the next step.

The second safeguard step is a determination of whether the torque converter ratio falls within certain prescribed limits <66>. Once again, these limits are dependent on the parameters of the clutch and a failure to be within these predefined, preset limits will result in the counter being set to zero <74>. An illustrative, but nonlimiting example, is a range between 120 as the upper limit of the torque converter ratio and 20 as the lower limit for the torque converter ratio, respectively for midsize wheel loaders and track-type tractors.

The third safeguard step merely compares the value of the counter with a predetermined time interval. A nonlimiting example of this time interval would include a summation of the pulse, ramp, hold, and modulation times <68>. If the value of the counter exceeds the summation of these time periods, the counter will be set to zero <74> and the program will stop. This is because the point in time representing the end of the fill period will have past.

The primary program step makes the determination as to whether or not there are two consecutive decreases in the torque converter ratio and whether at least one of these torque converter ratio decreases exceeds a predetermined value <70> for the preferred shorter cycle times. With the less preferred and longer program cycle times, only one decrease in the torque converter ratio below a predetermined value is required. In the alternative, this single decrease in the torque converter ratio can be determined after the fact by ascertaining when the torque converter ratio actually increases and then by looking backward, finding the first significant torque converter decrease. As previously described above, this threshold limit varies depending on the design and structure of the clutch. The design and structure of the clutch depends upon the type and nature of the machine as well as the machine manufacturer. In addition, the parameters may be altered due to different scaling factors in the software. An illustrative, but nonlimiting, example would include a threshold decrease of four (4) for the torque converter ratio of a midsize wheel loader or midsize track-type tractor. The software will keep looping through this primary program step <70>, the step of incrementing the counter by one (1) <62>, the first safeguard step <64>, the second safeguard step <66>, and the third safeguard step <68>, until this condition is reached and will then save the counter value at this point as the end-of-fill point <72>.

INDUSTRIAL APPLICABILITY

The present invention is advantageously applicable in controlling the shifting of a clutch utilized in a powershift transmission, typically, but not necessarily limited to, construction machines such as motor graders, wheel loaders, bulldozers, and the like. The following description is only for the purposes of illustration and is not intended to limit the present invention as such. It will be recognizable, by those skilled in the art, that the present invention is suitable for a plurality of other applications. To change the direction of a machine, a directional shift is required. This involves engagement of the respective clutch 29A through 29F that will provide the desired direction of movement.

The present invention detects the end-of-fill point by detecting if there is a decrease in the torque converter ratio exceeding a predetermined minimum level with preferably at least two consecutive decreases in the torque converter ratio with at least one of the torque converter decreases exceeding a predetermined minimum level. The fill time is defined as the time required to fill an on-coming clutch cavity with fluid. During this fill period, the clutch piston will stroke and the clutch plates touchup. However, until the clutch plates are initially compressed, the respective clutch 29A through 29F cannot transmit any torque. Therefore, the end-of-fill time is important in order to ascertain when this critical moment is reached. The present invention eliminates both early engagement and late engagement. Early or late engagement can result in a torque spike that is transmitted through the drivetrain 10 of the machine and creates a "jerk". The elimination of jerk will make the operator more comfortable and increase the life expectancy of the associated components located within the drivetrain of the machine. Elimination of late engagement pressure will prevent even greater amounts of jerk than early engagement.

In view of the foregoing, it is readily apparent that the subject end-of-fill detection method provides a determination of end-of-fill in a very simple and effective manner that results in a high quality engagement of a fluid actuated clutch.

Other aspects, objects and advantages of the present invention can be obtained from a study of the drawings, the disclosure and the appended claims.

What is claimed is:

1. A method for detecting an end-of-fill condition for a fluid actuated clutch, which is operatively connected to a control valve that is activated by an electronic controller that also receives a signal from an input mechanism, including a value for speed of an engine drive and a value of output speed for a torque converter, the method comprising the steps of:

detecting a torque converter ratio, which is said output speed of said torque converter divided by said speed of said engine drive; and detecting if there is a decrease in said torque converter ratio exceeding a predetermined level, where this condition represents the end-of-fill point for said fluid actuated clutch.

2. The method of claim 1, wherein said step of detecting a torque converter ratio includes the step of determining if said speed of said engine drive exceeds a predetermined minimum value.

3. The method of claim 1, wherein said step of detecting if there is a decrease in said torque converter ratio exceeding a predetermined level includes the step of determining if said torque converter ratio falls between predetermined minimum and maximum values.

4. The method of claim 1, wherein said step of detecting if there is a decrease in said torque converter ratio exceeding a predetermined level includes the step of determining if said end-of-fill point does not exceed a predetermined time interval.

5. The method of claim 4, wherein said predetermined time interval includes a summation of pulse time, ramp time, hold time, and modulation time.

6. The method of claim 1, wherein said step of detecting if there is a decrease in said torque converter ratio exceeding a predetermined level includes the step of determining when there is a positive increase in said torque converter ratio and then determining when said first decrease in the torque converter ratio exceeds a predetermined value that occurred prior to said positive increase in said torque converter ratio.

7. The method of claim 1, wherein said fluid actuated clutch is a directional clutch.

8. The method of claim 7, wherein said step of detecting a torque converter ratio includes the step of determining if said speed of said engine drive exceeds a predetermined minimum value.

9. The method of claim 7, wherein said step of detecting if there is a decrease in said torque converter ratio exceeding a predetermined level includes the step of determining if said torque converter ratio falls between predetermined minimum and maximum values.

10. The method of claim 7, wherein said step of detecting if there is a decrease in said torque converter ratio exceeding a predetermined level includes the step of determining if said end-of-fill point does not exceed a predetermined time interval.

11. The method of claim 7, wherein said step of detecting if there is a decrease in said torque converter ratio exceeding a predetermined level includes the step of determining when there is a positive increase in said torque converter ratio and then determining when said first decrease in the torque converter ratio exceeds a predetermined value that occurred prior to said positive increase in said torque converter ratio.

12. A method for detecting an end-of-fill condition for a fluid actuated clutch, which is operatively connected to a control valve that is activated by an electronic controller that also receives a signal from an input mechanism, including a value for speed of an engine drive and a value of output speed for a torque converter, the method comprising the steps of:
   detecting a torque converter ratio, which is said output speed of said torque converter divided by said speed of said engine drive; and
   detecting if there are at least two consecutive decreases in said torque converter ratio with at least one of said torque converter ratio decreases exceeding a predetermined level, where this condition represents the end-of-fill point for said fluid actuated clutch.

13. The method of claim 12, wherein said step of detecting a torque converter ratio includes the step of determining if said speed of said engine drive exceeds a predetermined minimum value.

14. The method of claim 12, wherein said step of detecting if there are at least two consecutive decreases in said torque converter ratio includes the step of determining if said torque converter ratio falls between predetermined minimum and maximum values.

15. The method of claim 12, wherein said step of detecting if there are at least two consecutive decreases in said torque converter ratio includes the step of determining if said end-of-fill point does not exceed a predetermined time interval.

16. The method of claim 12, wherein said fluid actuated clutch is a directional clutch.

17. The method of claim 16, wherein said step of detecting a torque converter ratio includes the step of determining if said speed of said engine drive exceeds a predetermined minimum value.

18. The method of claim 16, wherein said step of detecting if there are at least two consecutive decreases in said torque converter ratio includes the step of determining if said torque converter ratio falls between predetermined minimum and maximum values.

19. The method of claim 16, wherein said step of detecting if there are at least two consecutive decreases in said torque converter ratio includes the step of determining if said end-of-fill point does not exceed a summation of pulse time, ramp time, hold time, and modulation time.

20. A method for detecting an end-of-fill condition for a plurality of fluid actuated clutches, each of which is operatively connected in a one-to-one correspondence to a plurality of control valves that are activated by an electronic controller that also receives a signal from at least one input mechanism, said signal including a value for speed of an engine drive and a value of output speed for a torque converter, the method comprising the steps of:
   detecting a torque converter ratio, which is said output speed of said torque converter divided by said speed of said engine drive; and
   detecting if there is a torque converter ratio decrease exceeding a predetermined minimum level, where this condition represents an end-of-fill point for any of said plurality of fluid actuated clutches.

* * * * *